(12) United States Patent
Gregg

(10) Patent No.: US 7,660,912 B2
(45) Date of Patent: Feb. 9, 2010

(54) I/O ADAPTER LPAR ISOLATION IN A HYPERTRANSPORT ENVIRONMENT

(75) Inventor: Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 11/550,618

(22) Filed: Oct. 18, 2006

(65) Prior Publication Data
US 2008/0147891 A1 Jun. 19, 2008

(51) Int. Cl.
G06F 3/00 (2006.01)
G06F 13/14 (2006.01)
(52) U.S. Cl. .......................................... 710/5; 710/305
(58) Field of Classification Search ...................... 710/5
See application file for complete search history.

(56) References Cited

U.S. PATENT DOCUMENTS

| | | | |
|---|---|---|---|
| 5,497,490 A | 3/1996 | Harada et al. | |
| 6,002,883 A | 12/1999 | Goldrian | |
| 6,311,255 B1 | 10/2001 | Sadana | |
| 6,523,140 B1* | 2/2003 | Arndt et al. | 714/44 |
| 6,721,816 B1* | 4/2004 | Magro et al. | 710/6 |
| 7,007,125 B2 | 2/2006 | Barker et al. | |
| 7,225,287 B2 | 5/2007 | Wooten | |
| 7,363,404 B2 | 4/2008 | Boyd et al. | |
| 2002/0152335 A1 | 10/2002 | Holm et al. | |
| 2002/0194437 A1 | 12/2002 | Kapoor et al. | |
| 2003/0145136 A1* | 7/2003 | Tierney et al. | 710/3 |
| 2003/0172322 A1* | 9/2003 | Kitamorn et al. | 714/43 |
| 2003/0236852 A1 | 12/2003 | Fernandes et al. | |
| 2004/0030712 A1 | 2/2004 | Sano et al. | |
| 2004/0210817 A1 | 10/2004 | Kapoor et al. | |
| 2006/0010276 A1 | 1/2006 | Arndt et al. | |
| 2006/0010355 A1 | 1/2006 | Arndt et al. | |
| 2006/0064523 A1 | 3/2006 | Moriki et al. | |
| 2006/0179195 A1 | 8/2006 | Sharma et al. | |
| 2006/0195675 A1 | 8/2006 | Arndt et al. | |
| 2007/0136554 A1 | 6/2007 | Biran et al. | |
| 2007/0168636 A1 | 7/2007 | Hummel et al. | |
| 2007/0168641 A1 | 7/2007 | Hummel et al. | |

(Continued)

OTHER PUBLICATIONS

Advanced Micro Devices, PID 34434, Rev. 1.00, Feb. 3, 2006, AMD I/O Virtualization Technology (IOMMU) specification, pp. 1-52.

Primary Examiner—Henry W. H. Tsai
Assistant Examiner—Juanito C Borromeo
(74) Attorney, Agent, or Firm—Scully, Scott, Murphy & Presser, P.C.; Richard Lau, Esq.

(57) ABSTRACT

Disclosed are a data processing system and a method of isolating a plurality of input/output adapter units of that system. The data processing system comprises, in addition to the input/output adapter units, a set of processors, a host bridge, and a system bus connecting the set of processors and the host bridge. Each of the input/output adapter units has a respective identifier; and the set of processors send commands to the host bridge, said commands including one or more of the identifiers of the input/output adapter units. In the preferred embodiment, these identifiers are HyperTransport defined Unit IDs, and the commands issued by the set of processors include a Unit ID field including one or more of the Unit IDs of input/output adapters.

9 Claims, 4 Drawing Sheets

U.S. PATENT DOCUMENTS

| | | |
|---|---|---|
| 2007/0168644 A1 | 7/2007 | Hummel et al. |
| 2008/0147891 A1 | 6/2008 | Gregg |
| 2008/0168186 A1 | 7/2008 | Gregg |
| 2008/0168207 A1 | 7/2008 | Gregg |
| 2008/0168208 A1 | 7/2008 | Gregg |

* cited by examiner

MOVING ISOLATION FUNCTIONS TOWARDS THE PROCESSOR

I/O ADAPTER LPAR ISOLATION IN A HYPERTRANSPORT ENVIRONMENT

BACKGROUND OF THE INVENTION

1. Field of the Invention

This invention generally relates to data processing, and more specifically, to isolating input/output adapter addressing domains in a data processing system. Even more specifically, the invention relates to isolating input/output adapter addressing domains in a logically partitioned data processing system operating in a HyperTransport environment.

2. Background Art

In an LPAR data processing system, multiple operating systems or multiple copies of a single operating system are run on a single data processing system platform. Each operating system or operating system copy executing within the data processing system is assigned to a different logical partition, and each partition is allocated a non-overlapping subset of the resources of the platform. Thus, each operating system or operating system copy directly controls a distinct set of allocatable resources within the platform.

Among the platform resources that may be allocated to different partitions in an LPAR data processing system include processors or time slices of processors, regions of system memory and IOAs or parts of IOAs. Thus, different regions of system memory and different IOAs or parts of IOAs may be assigned to different partitions of the system. In such an environment, it is important that the platform provide a mechanism to enable IOAs or parts of IOAs to obtain access to all the physical memory that they require to properly service the partition or partitions to which they have been assigned; while, at the same time prevent IOAs or parts of IOAs from obtaining access to physical memory that has not been allocated to their associated partitions.

In a LPAR data processing system, various communication technologies may be used to link together the electronic devices of the system via both physical media and wirelessly. Some communication technologies interface a pair of devices, other communication technologies interface small groups of devices, and still other communication technologies interface large groups of devices.

One relatively new communication technology for coupling relatively small groups of devices is the HyperTransport (HT) technology. The HT Standard sets forth definitions for a high-speed, low-latency protocol that can interface with today's buses like AGP, PCI, SPI, 1394, USB 2.0, and IGbit Ethernet as well as next generation buses including AGP 8x, Infiniband, PCI-X, PCI 3.0, PCIe, and 10 Gbit Ethernet. HT interconnects provide high-speed data links between coupled devices. Most HT enabled devices include at least a pair of HT ports so that HT enabled devices may be daisy-chained. In an HT chain or fabric, each coupled device may communicate with each other coupled device using appropriate addressing and control. Examples of devices that may be HT chained include packet data routers, server computers, data storage devices, and other computer peripheral devices, among others.

HT thus offers many important advantages. Using HyperTransport attached I/O bridges in a logically partitioned data processing system, however, requires a way of isolating I/O adapter DMA and interrupt requests to the owning LPAR.

Importantly, one LPAR could affect another through an IOA. With LPAR, the OS does not guarantee successful communications. For example, one OS may send commands and addresses to an IOA, and the IOA would do the DMA using these addresses. There is no mechanism to check the addresses provided by the OS to the IOA. Instead, the BAR/limit (and later, the TVT structure) verifies the address when it is presented to the host by the IOA.

SUMMARY OF THE INVENTION

An object of this invention is to provide a method of and system for I/O adapter LPAR isolation.

Another object of the present invention is to provide I/O adapter LPAR isolation in a HyperTransport environment.

A further object of the invention is to assign Unit IDs (HyperTransport defined) to individual I/O adapters, and to use the assigned Unit IDs to isolate I/O adapters to the owning LPAR.

These and other objectives are attained with a data processing system and a method of isolating a plurality of input/output adapter units of that system. The data processing system comprises, in addition to the plurality of input/output adapter units, a set of processors, a host bridge, and a system bus connecting the set of processors and the host bridge. Each of the input/output adapter units is connected to the host bridge and has a respective identifier. The set of processors includes functionality for sending commands to the host bridge, said commands including one or more of the identifiers to identify a set of the input/output adapter units.

In the preferred embodiment, these identifiers are HyperTransport defined Unit IDs. Also, preferably, the commands issued by the set of processors include a Unit ID field including one or more of the Unit IDs for identifying said set of input/output adapters. By assigning Unit IDs (HyperTransport defined) to individual input/output adapters, DMA and interrupt requests can be verified. At the processor, the Unit IDs, rather than the PCI defined requester ID, which includes bus, device and function values, are validated in the processor.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
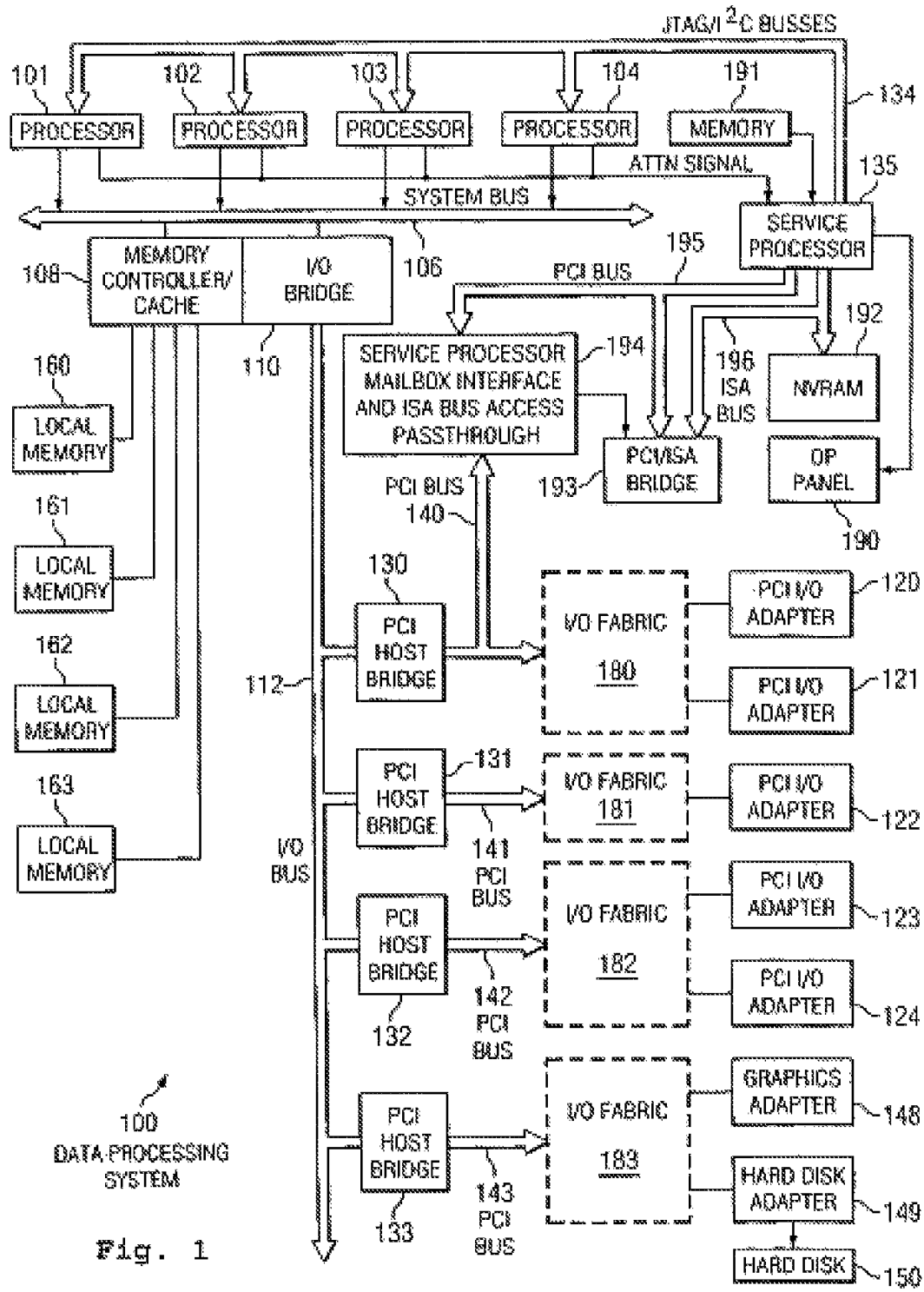
FIG. 1 is a block diagram of a data processing system in which the present invention may be implemented.

With reference now to the figures, FIG. 1 depicts a block diagram of a data processing system in which the present invention may be implemented. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system, however, it should be understood that the invention is not limited to an LPAR system but can also be implemented in other data processing systems. LPAR data processing system 100 has multiple heterogeneous operating systems (or multiple copies of a single operating system) running simultaneously. Each of these multiple operating systems may have any number of software programs executing within it. Data processing system 100 is logically partitioned such that different PCI input/output adapters (IOAs) 120, 121, 122, 123 and 124, graphics adapter 148 and hard disk adapter 149, or parts thereof, may be assigned to different logical partitions. In this case, graphics adapter 148 provides a connection for a display device (not shown), while hard disk adapter 149 provides a connection to control hard disk 150.

Multiple partitions may run in the same physical processor. Thus, for example, suppose data processing system 100 is divided into three logical partitions, P1, P2, and P3. Each of PCI IOAs 120-124, graphics adapter 148, hard disk adapter 149, each of host processors 101-104, and memory from local memories 160-163 is assigned to each of the three partitions. In this example, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and PCI IOAs 121, 123 and 124 may be assigned to logical partition P1; processors 102-103, some portion of memory from local memories 160-163, and PCI IOAs 120 and 122 may be assigned to partition P2; and processor 104, some portion of memory from local memories 160-163, graphics adapter 148 and hard disk adapter 149 may be assigned to logical partition P3.

Each operating system executing within a logically partitioned data processing system 100 is assigned to a different logical partition. Thus, each operating system executing within data processing system 100 may access only those IOAs that are within its logical partition. For example, one instance of the Advanced Interactive Executive (AIX) operating system may be executing within partition P1, a second instance (copy) of the AIX operating system may be executing within partition P2, and a Linux or OS/400 operating system may be operating within logical partition P3.

Peripheral component interconnect (PCI) host bridges (PHBs) 130, 131, 132 and 133 are connected to I/O bus 112 and provide interfaces to PCI local busses 140, 141, 142 and 143, respectively. PCI IOAs 120-121 are connected to PCI local bus 140 through I/O fabric 180, which comprises switches and bridges. In a similar manner, PCI IOA 122 is connected to PCI local bus 141 through I/O fabric 181, PCI IOAs 123 and 124 are connected to PCI local bus 142 through I/O fabric 182, and graphics adapter 148 and hard disk adapter 149 are connected to PCI local bus 143 through I/O fabric 183. The I/O fabrics 180-183 provide interfaces to PCI busses 140-143. A typical PCI host bridge will support between four and eight IOAs (for example, expansion slots for add-in connectors). Each PCI IOA 120-124 provides an interface between data processing system 100 and input/output devices such as, for example, other network computers, which are clients to data processing system 100.

PCI host bridge 130 provides an interface for PCI bus 140 to connect to I/O bus 112. This PCI bus also connects PCI host bridge 130 to service processor mailbox interface and ISA bus access pass-through logic 194 and I/O fabric 180. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At completion of this step, service processor 135 has an inventory and topology understanding of data processing system. 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using an IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
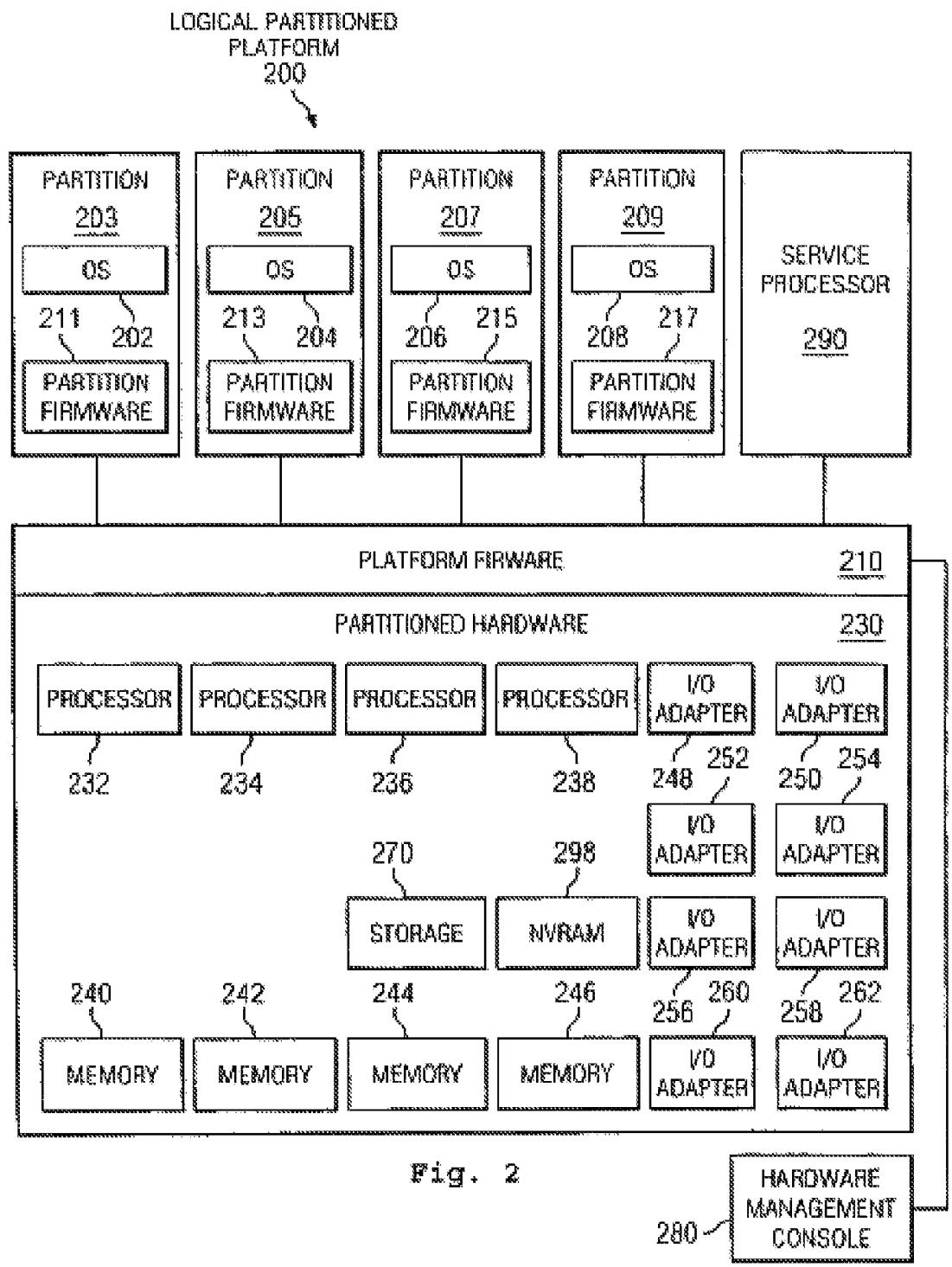
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Other types of operating systems, such as AIX and Linux, may also be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of IOAs 248-262, and a storage unit 270. Each of the processors 232-238, memory units 240-246, NVRAM storage 298, and IOAs 248-262, or parts thereof, may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

In an LPAR environment, it is not permissible for resources or programs in one partition to affect operations in another partition. Furthermore, to be useful, the assignment of resources needs to be fine-grained. For example, it is often not acceptable to assign all IOAs under a particular PHB to the same partition, as that will restrict configurability of the system, including the ability to dynamically move resources between partitions.

Accordingly, some functionality is needed in the bridges that connect IOAs to the I/O bus so as to be able to assign resources, such as individual IOAs or parts of IOAs to separate partitions; and, at the same time, prevent the assigned resources from affecting other partitions such as by obtaining access to resources of the other partitions.

A number of such functionalities are known in the art, and for example, several procedures for isolating input/output addressing are described in U.S. patent application publication no. 2006/0010276. Such functionalities, however, have not heretofore been available for a data processing system utilizing HyperTransport technology, which, as mentioned above, is a communication technology for coupling relative small groups of devices.

Figure 3:
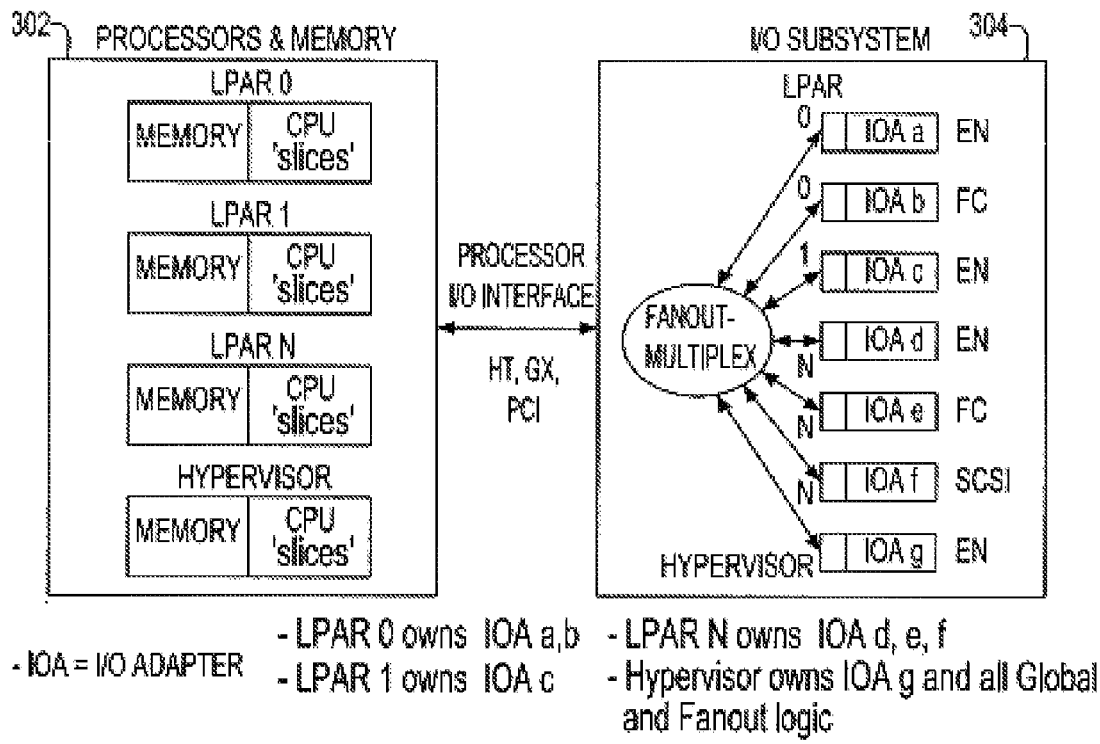
FIG. 3 is a logical view of LPAR for I/O

FIG. 3 shows a logical view of LPAR for I/O. In particular, in the logical view of FIG. 3, processors and memory are shown at 302, and the I/O subsystem is shown at 304. Logical partitioning, as mentioned above, allocates processor and memory resources to multiple, independent system images (LPARs), each capable of running an independent operating system. Each LPAR is logically isolated from all other LPARs, and one LPAR is not allowed to directly access another LPAR's memory. All memory addresses generated by IOAs must be verified and/or translated to ensure they access only allowed memory addresses.

One LPAR is not allowed to directly access another LPAR's IOAs, and MMIO space access is controlled via TLB mechanisms on 4K page boundaries. Also, one LPAR cannot cause an IOA to send interrupts to another LPAR, and errors caused by IOAs owned by one LPAR cannot be allowed to affect another LPAR. Communication between LPARs uses normal IPC methods or uses the hypervisor, and communications between IOAs (peer-to-peer) is not allowed.

The hypervisor is a special trusted image and performs a number of important functions. The hypervisor controls access of all resources (processors, memory, and IOAs) to the LPARs; and the hypervisor controls all global logic, multiplexors, fanout, switches, real time memory address registers, memory address translation tables, etc.

I/O operations may be performed by the hypervisor on behalf of the LPARs. This requires hypervisor overhead (hCalls, data copies, interrupt routing). For example, as shown in FIG. 3, the hypervisor image owns IOA g. High performance I/O allocates IOAs to LPARs; and, for instance as shown in FIG. 3, LPAR 0 owns IOAs a and b, and LPAR 1 owns IOA c.

Figure 4:
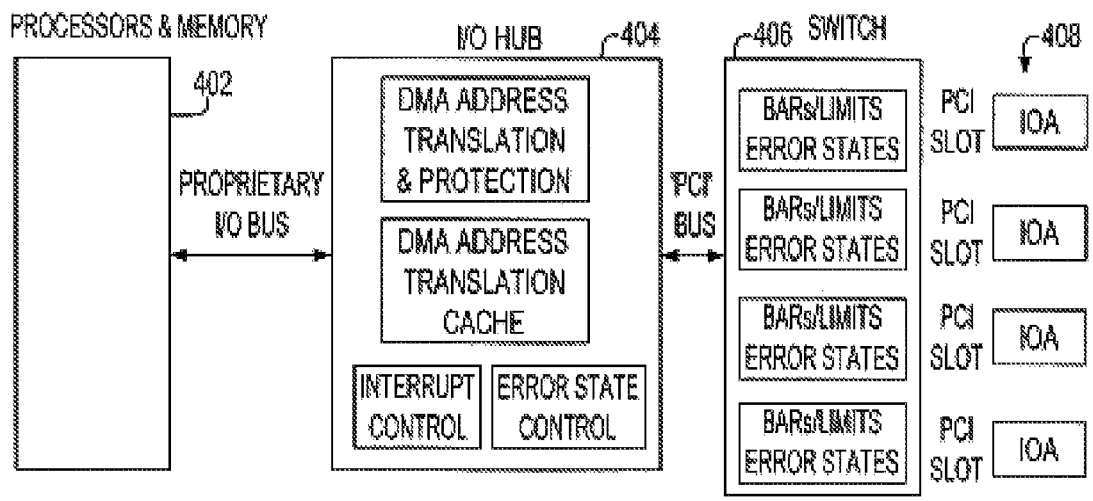
FIG. 4 illustrates a present slot identification arrangement.

FIG. 4 shows a currently used slot identification arrangement. In the view of FIG. 4, processors and memory are shown at 402, an I/O hub is shown at 404, a series of switches are shown at 406, and a group of IOAs are shown at 408. With this arrangement, each PCI slot and the attached IOAs are owned by a single LPAR. The switch includes isolation logic based on address ranges (BAR/Limit). With the arrangement shown in FIG. 4, the I/O hub and the processors do not isolate the 10 adapters.

Figure 5:
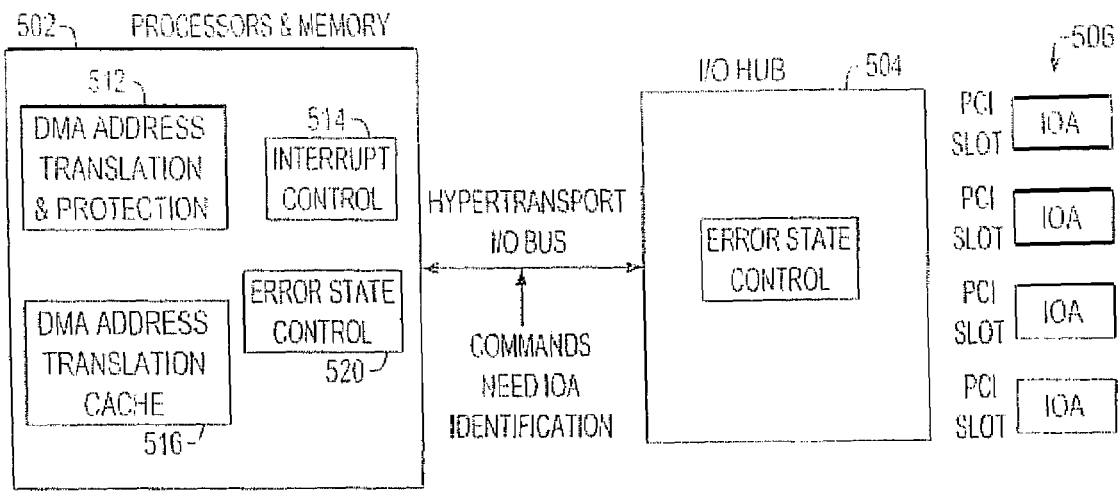
FIG. 5 shows an arrangement in which isolation functions are moved towards the processor.

FIG. 4 shows physical slots. In contrast, the present invention uses "Slot IDs." FIG. 5 illustrates an arrangement in which, compared with FIG. 4, isolation functions are moved towards the processor. In particular, in the view of FIG. 5, processors and memory are shown at 502, an I/O hub is shown at 504, and a group of ICAs are shown at 506. As shown in FIG. 5, DMA address translation and protection 512, interrupt control 514, DMA address translation cache 516, and error state control 520 are performed by the processor, rather than the I/O hub. Here too, though, each PCI slot and the attached IOA are owned by a single LPAR. The arrangement of FIG. 5 requires minimal isolation logic in the north/south bridges.

With the present TVE (TCE Validation Table) design (DMA and interrupt), PCI address ranges are still used as the primary isolation method. Some higher order bits of the PCI address are used as an index into the TVE. The TVE entry includes a "bus/dev/func" field that can be compared to the requesting IOAs "bus/dev/func" value. If the bus/dev/func compare is valid, the TCE Base address Registers (TAR) in the TVT is used to find the TCE in system memory (or in a TCE cache).

Figure 6:
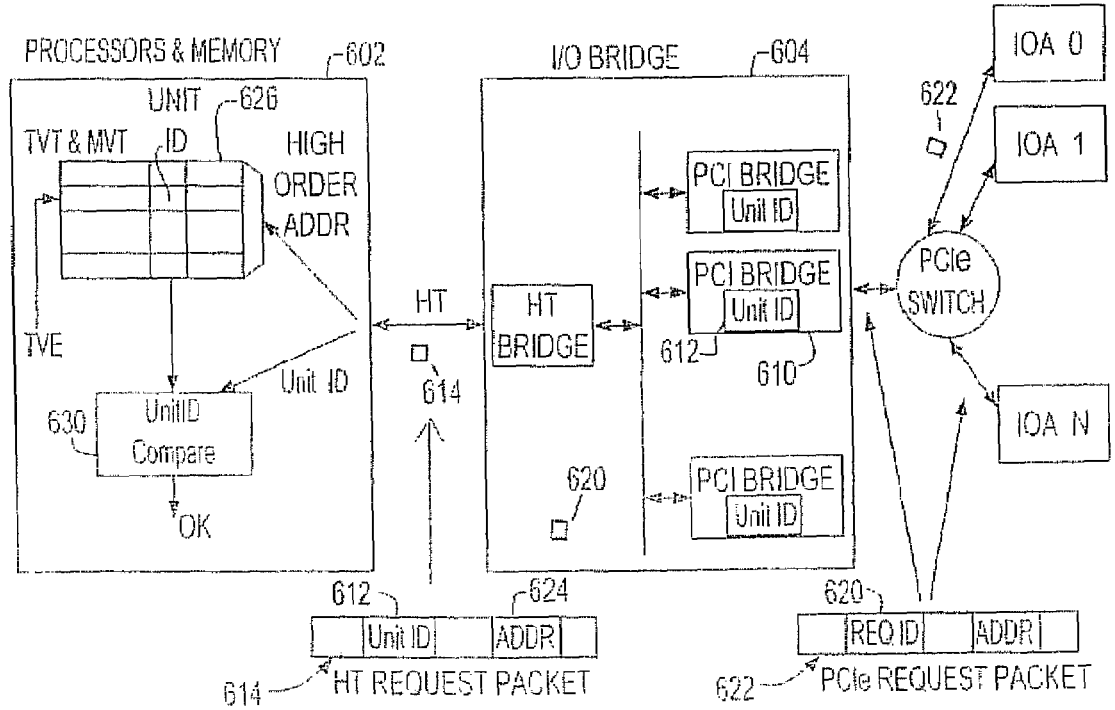
FIG. 6 shows DMA/MSI access control in a HyperTransport environment.

In accordance with the preferred embodiment of the present invention, IOAs are identified by the HyperTransport Unit ID field, which is five bits. FIG. 6 illustrates this access control in an HT environment. In the view of FIG. 6, processors and memory are shown at 602, an I/O bridge is shown at 604, and a group of IOAs are shown at 606. Each PCI Bridge 610 in the I/O Bridge 604 has one UnitID 612, and all IOAs under a PCI Bridge are 'owned' by a single LPAR. The UnitID is inserted into HT requests 614, and the REQ ID in the PCIe packet is 16 bits: Bus (8), Device (5), Function (3). Bus/dev/func. Also, the REQ ID 620 from a PCIe request 622 is stored in the PCI Bridge and returned to the IOA in the PCIe Completion.

In operation, the IOA generates a PCIe Request 622 (DMA Read or Write), and the PCI Bridge stores the REQ ID and generates HT commands to satisfy the PCIe Request. Then, the PCI Bridge uses its UnitID in the HT Requests it generates, and the Processor receives the HT Request and uses some of the high order bits in the Address 624 to index into the TVT (Translation Validation Table) 626. Each TVE (Translation Validation Entry) includes a UnitID, and the Unit IDs from the TVE and HT Request 614 are compared at 630. If these unit IDs are equal, the test passes. The HT Response is then sent back from the Processor to the PCI Bridge. The UnitID routes the response to the appropriate PCI Bridge, and the PCI Bridge inserts the REQ ID into the PCIe Response packet(s).

It should be noted that the present invention, or aspects of the invention, can be embodied in a computer program product, which comprises features enabling the implementation of methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of isolating a plurality of input/output adapter units of a data processing system, said data processing system comprising a set of processors, a plurality of host bridges, and a plurality of input/output adapters, wherein each of the input/output adapters is connected to one of the host bridges, and each of the host bridges is connected to one or more of the input/output adapters, said method comprising the steps of:

partitioning the data processing system into a group of partitions;

assigning each of the host bridges to one and only one of the partitions;

assigning to each of the host bridges a respective Unit ID;

providing a table having a series of entries, each of the entries including a Unit ID identifying one of the host bridges;

one of the input/output adapters generating a request having a request ID and a specified address, and sending said request to the one of the host bridges to which said one of the input/output adapters is connected;

said one of the host bridges generating a request packet to satisfy the request, putting into the request packet the Unit ID of said one of the host bridges and the specified address from the request, and sending the request packet to one of the processors; and said one of the processors receiving the request packet, using said specified address from the request packet as an index into said tables, to obtain one of the Unit IDs from said table, and comparing the Unit ID obtained from the table with the Unit ID of said one of the host bridges to determine whether to route a response packet back said one of the host bridges.

2. A method according to claim 1, wherein each of the plurality of input/output adapter units is capable of being assigned, on the basis of the Unit ID of said each of the host bridges, to a different one of said partitions.

3. A method according to claim 1, wherein said commands include a Unit ID field having one or more of the Unit IDs for identifying said set of input/output adapters.

4. A data processing system, comprising:

a set of processors;

a plurality of host bridges;

a system bus connecting the set of processors and the host bridges, wherein the data processing system is partitioned into a group of partitions and each of the host bridges is assigned at any given time to one and only one of the partitions, and wherein each of the host bridges is assigned a respective Unit ID; and a plurality of input/output adapter units connected to the host bridges, wherein each of the input/output adapter units is connected to one of the host bridges, and each of the host bridges is connected to one or more of the input/output adapters; and a table having a series of entries, each of the entries including a Unit ID identifying one of the host bridges;

wherein one of the input/output adapters generates a request having a request ID and a specified address, and sends said request to the one of the host bridges to which said one of the input/output adapters is connected, and said one of the host bridges generates a request packet to satisfy the request, puts into the request packet the Unit ID of said one of the host bridges and the specified address from the request, and sends the request packet to one of the processors;

said one of the processors includes functionality for receiving the request packet, for using said specified address from the request packet as an index into said table to obtain one of the Unit IDs from said table and for comparing the Unit ID obtained from the table with the Unit ID of said one of the host bridges to determine whether to route a response packet back to said one of the host bridges.

5. A data processing system according to claim 4, wherein each of the plurality of input/output adapter units is capable of being assigned, on the basis of the Unit ID of said each of the host bridges, to a different one of said partitions.

6. A program storage device readable by machine, tangibly embodying a program of instructions executable by the machine to perform method steps for isolating a plurality of input/output adapter units of a data processing system, said data processing system comprising a set of processors, a plurality of host bridges, and a plurality of input/output adapters, wherein each of the input/output adapter is connected to one of the host bridges, and each of the host bridges is connected to one or more of the input/output adapters, said method steps comprising:

partitioning the data processing system into a group of partitions;

assigning each of the host bridges to one and only one of the partitions;

assigning to each of the host bridges a respective Unit ID;

using said specified address from the request packet as an index into said table to obtain one of the Unit IDs from said table and comparing the Unit ID obtained from the table with the Unit ID of said one of the host bridges to determine whether to route a response packet back to said one of the host bridges.

7. A program storage device according to claim 6, wherein said host bridge includes functionality for isolating the plurality of input/output adapter units based on said Unit IDs.

8. The method according to claim 1, wherein the data processing system includes a memory and a respective one portion of the memory is allocated to each of the partitions, and wherein the specified address is a specified memory address.

9. The method according to claim 8, wherein each of the input/output adapters is allocated to one of the partitions and said comparing is done to verify that the specified memory address has been allocated to the same partition to which said one of the input/output adapters has been allocated.

* * * * *